(12) United States Patent
Duecoffre et al.

(10) Patent No.: US 6,200,639 B1
(45) Date of Patent: Mar. 13, 2001

(54) COATING AGENT, THE MANUFACTURE AND USES THEREOF

(75) Inventors: Volker Duecoffre; Walter Schubert; Friedrich Herrmann; Carmen Flosbach; Claudia Leckebusch, all of Wuppertal (DE)

(73) Assignee: Herberts GmbH., KG, Wuppertal (DE)

( * ) Notice: Subject to any disclaimer, the term of this patent is extended or adjusted under 35 U.S.C. 154(b) by 0 days.

(21) Appl. No.: 09/319,957

(22) PCT Filed: Dec. 11, 1997

(86) PCT No.: PCT/EP97/06911

§ 371 Date: Jun. 14, 1999

§ 102(e) Date: Jun. 14, 1999

(87) PCT Pub. No.: WO98/27172

PCT Pub. Date: Jun. 25, 1998

(30) Foreign Application Priority Data

Dec. 14, 1996 (DE) ............................................. 196 52 144

(51) Int. Cl.[7] ..................... C09D 133/02; C09D 137/00; C09D 167/02
(52) U.S. Cl. ................... 427/386; 427/388.2; 427/388.4; 427/407.1; 427/409; 427/410; 524/507; 524/513; 524/517; 525/125; 525/131; 525/176; 525/194; 525/208
(58) Field of Search .................................... 525/176, 125, 525/131, 194, 208; 524/507, 513, 517; 427/386, 388.2, 407.1, 409, 410, 388.4

(56) References Cited

U.S. PATENT DOCUMENTS

| 4,082,816 | 4/1978 | Fisk . |
|---|---|---|
| 4,371,667 | 2/1983 | Moller . |
| 4,501,829 | 2/1985 | Oda . |
| 4,524,183 | 6/1985 | Weber . |
| 4,981,921 | 1/1991 | Blum . |
| 5,739,216 | 4/1998 | Duecoffre . |

FOREIGN PATENT DOCUMENTS

| 2 333 384 | 1/1975 | (DE) . |
|---|---|---|
| 103 146 A1 | 3/1984 | (EP) . |
| 509 392 A1 | 10/1992 | (EP) . |
| 517 536 A2 | 12/1992 | (EP) . |
| WO 84/00771 | 3/1984 | (WO) . |

Primary Examiner—Patricia A. Short
(74) Attorney, Agent, or Firm—Pillsbury Winthrop LLP

(57) ABSTRACT

Coating composition suitable for multi-layer lacquerings, with a binder composition which comprises:

A) 25 to 75 wt. % of carboxyl-functional (meth)acrylic copolymers and/or carboxyl-functional polyesters, the carboxyl functionality of which corresponds to an acid number of 15 to 300 mg KOH/g, B) 25 to 75 wt. % of epoxide-functionalized crosslinker resins, at least one of which is a (meth)acrylic copolymer which has been prepared co-using tert-butyl (meth)acrylate, C) 0 to 50 wt. % of polyols which have at least two hydroxyl functions in the molecule, D) 0 to 40 wt. % of components which crosslink with hydroxyl groups to form ethers, and/or of a crosslinking agent based on triazine, E) 0 to 40 wt. % of polyisocyanates, F) 0 to 50 wt. % of at least one organic polyanhydride with at least two cyclic carboxylic acid anhydride groups per molecule, G) 0 to 20 wt. % of reactive thinners with an epoxide function, H) 0 to 10 wt. % of one or more catalysts for the reaction of carboxyl and epoxide groups.

6 Claims, No Drawings

COATING AGENT, THE MANUFACTURE AND USES THEREOF

This application is the national phase of international application PCT/EP97/06911 filed Dec. 11, 1997 which designated the U.S.

FIELD OF THE INVENTION

The invention relates to aqueous and/or solvent-containing coating agent compositions which are suitable for coatings which are stoved at elevated temperature, and in particular for the production of multilayer lacquerings, for example in the motor vehicle sector.

BACKGROUND OF THE INVENTION

A stoving lacquer in which polymers containing carboxyl groups, such as e.g. acrylates based on acrylic acid or methacrylic acid and acrylates containing glycidyl groups, are mixed to give a curable composition is known from DE-A-30 22 996.

WO 84/00771 describes a multi-component system in which four types of binder are mixed with one another and the mixture is then applied. The components are acrylate containing hydroxyl groups, acid anhydride, at least 50% being alkylhexahydrophthalic acid anhydrides, epoxy resin and melamine resin. The systems have a high solids content.

DE-A-23 33 384 describes a binder based on acrylated polyesters which are obtained by polymerization of an acrylate containing hydroxyl groups in a polyester or alkyd resin containing hydroxyl groups. The crosslinking can be carried out with melamine resins and simultaneously epoxy resins.

DE-A-38 00 389 describes the modification of copolymers containing hydroxyl groups with lactones, in particular with epsilon-caprolactone.

U.S. Pat. No. 4,501,829 described polyesters with hydroxyl and carboxyl groups which are reacted with lactones. The reaction takes place on the hydroxyl groups.

U.S. Pat. No. 4,082,816 describes compositions of (meth)acrylic copolymers modified with caprolactone and containing carboxyl groups and melamine-formaldehyde resins.

The known coating compositions in some cases lead to film of high hardness and good resistance to weathering. However, they do not meet the constantly increasing requirements of high resistance to acids and resistance to solvents.

DE 44 16 282 describes stoving lacquers which are based on crosslinking of acid polyesters, which are urethanized, with polyepoxides. DE 42 37 658 also describes carboxyepoxy lacquers for stoving systems. In these, the carboxyl group chains are lengthened with caprolactone to increase the reactivity. These systems are distinguished by excellent resistance to chemicals. All these systems have the common feature that they tend to run, especially in very high coating thicknesses.

EP-A-0 509 392 and EP-A-0 517 536 describe powder lacquer resins in which tert-butyl (meth)acrylate and glycidyl methacrylate are copolymerized. This monomer combination is said to lead to an increased reactivity.

SUMMARY OF THE INVENTION

The object of the invention is to provide a binder system which can be processed to aqueous and/or solvent-containing coating compositions which can be stoved at elevated temperature and lead to coating with a good hardness, good resistance to weathering and high elasticity, and which furthermore are resistant to acids and resistant to solvents. The coating compositions should furthermore have a good application reliability (reduced tendency to run), even at high coating thicknesses. In particular, the coating compositions should show no yellowing at all on stoving and have a high storage stability. A high boiling resistance is an essential requirement.

It has been found that this object can be achieved by an aqueous or solvent-containing coating composition which comprises a binder system based on carboxyl-functional (meth)acrylic copolymers and/or polyesters with an epoxide-functionalized (meth)acrylic copolymer as the crosslinking agent, the epoxide-functionalized (meth)acrylic copolymer having been prepared co-using tert-butyl (meth)acrylate as a monomer unit.

The invention thus provides a coating composition comprising a binder composition, solvent and/or water and optionally pigments and/or fillers and optionally the conventional additives in lacquers, which is characterized in that the binder composition comprises:

A) 25 to 75 wt. % of one or more carboxyl-functional (meth)acrylic copolymers and/or one or more carboxyl-functional polyesters, the carboxyl functionality of which in each case corresponds to an acid number of 15 to 300 mg KOH/g, B) 25 to 75 wt. % of one or more epoxide-functionalized crosslinker resins, at least one of these crosslinker resins being a (meth)acrylic copolymer which has been prepared co-using tert-butyl (meth)acrylate as the monomer unit, C) 0 to 50 wt. % of one or more polyols which have at least two hydroxyl functions in the molecule and differ from a component A) optionally containing hydroxyl functions, D) 0 to 40 wt. % of components which crosslink with hydroxyl groups to form ethers, and/or of a crosslinking agent based on triazine, E) 0 to 40 wt. % of one or more polyisocyanates, which can optionally be masked, F) 0 to 50 wt. % of an anhydride component comprising at least one organic polyanhydride with at least two cyclic carboxylic acid anhydride groups per molecule, G) 0 to 20 wt. % of one or more reactive thinners with an epoxide function, H) 0 to 10 wt. % of one or more catalysts to catalyse the reaction of carboxyl and epoxide groups, the sum of the wt. % of components A) to H) adding up to 100 wt. %.

According to a preferred embodiment of the invention, the epoxide-functional crosslinker resin is based on (meth)acrylic copolymers which have been prepared co-using 3 to 50 wt. % tert-butyl (meth)acrylate, based on the total weight of the monomer units.

According to another preferred embodiment of the invention, a crosslinker component B) is employed which comprises at least one crosslinker resin based on (meth)acrylic copolymers which has been prepared using the following monomer units:

b1) 5 to 60 wt. % of one or more epoxide-functional olefinically unsaturated monomers, in particular glycidyl (meth)acrylate, b2) 3 to 50 wt. % tert-butyl (meth)acrylate, b3) 0 to 60 wt. % of one or more aromatic vinyl-functional monomers, b4) 0 to 20 wt. % of one or more hydroxyl-functional (meth)acrylic monomers, b5) 0 to 92 wt. % of one or more monomers which differ from b1) to b4), the sum of the wt. % of b1) to b5) adding up to 100 wt. %.

It has been found, surprisingly, that the aqueous or solvent-containing coating compositions according to the invention lead to coatings which, in spite of an expected possible formation of cleavage products during the advanced crosslinking reaction, achieve a high boiling resistance, the other requirements according to the object being at an unchanged high level.

In component A) of the binder or coating agent compositions according to the invention, the carboxyl groups can be modified by reaction with lactones. A "chain-lengthening" of the carboxyl groups takes place by the adding on of lactones. By ring-opening of the lactone to be added on, the carboxyl groups originally on the (meth) acrylic copolymer matrix and/or on the polyester matrix are esterified, but the lactone carboxyl groups are liberated and reaction products which contain exposed carboxyl groups on the short side chains corresponding to the lactone are thus formed.

According to a preferred embodiment of the invention, the carboxyl-functionalized (meth)acrylic copolymers, which optionally contain urethane groups and can be reacted with lactone, have a number-average molecular weight (Mn) of 1,000 to 30,000 g/mol. The carboxyl-functionalized polyesters which optionally contain urethane groups and can correspondingly be employed preferably have a calculated molecular weight of 500 to 4,000 g/mol, for example 800 to 4,000 g/mol. The acid number of these starting materials is 15 to 300 mg KOH/g, preferably 30 to 250 mg KOH/g, and particularly preferably 60 to 200 mg KOH/g.

In the preparation of (meth)acrylic copolymers or polyesters which contain carboxyl groups, can optionally each contain urethane groups and can be employed as component A), the carboxyl groups can be introduced directly by using units containing carboxyl groups, for example, in the build-up of polymers, such as (meth)acrylic copolymers. Examples of suitable monomers which contain carboxyl groups and can be used for this purpose are unsaturated carboxylic acids, such as e.g. acrylic, methacrylic, itaconic, crotonic, isocrotonic, aconitic, maleic and fumaric acid, half-esters of maleic and fumaric acid and carboxyalkyl esters of (meth)acrylic acid, e.g. beta-carboxyethyl acrylate, and adducts of hydroxyalkyl esters of acrylic acid and/or methacrylic with carboxylic acid anhydrides, such as e.g. phthalic acid mono-2-(meth)acryloyloxyethyl ester.

The term (meth)acrylic is used in the present description and the patent claims. This means acrylic and/or methacrylic.

In the preparation of (meth)acrylic copolymers or polyesters which contain carboxyl groups and optionally contain urethane groups, however, it is also possible first to build up a polymer which contains hydroxyl groups and optionally also already carboxyl groups and has an OH number of 15 to 300 mg KOH/g, and to introduce all or some of the carboxyl groups in a second stage by reaction with carboxylic acid anhydrides. In this procedure, ratios of amounts are used such that optionally sufficient OH groups remain to be able to carry out a urethanization.

Carboxylic acid anhydrides which are suitable for addition on to the polymers which contain hydroxyl groups and which can already contain carboxyl groups are the anhydrides of aliphatic, cycloaliphatic and aromatic saturated and/or unsaturated di- and polycarboxylic acids, such as, for example, the anhydrides of phthalic acid, tetrahydrophthalic acid, hexahydrophthalic acid, succinic acid, maleic acid, itaconic acid, glutaric acid, trimellitic acid and pyromellitic acid, and halogenated or alkylated derivatives thereof.

Anhydrides of phthalic acid, tetrahydro- and hexahydrophthalic acid and 5-methylhexahydrophthalic acid anhydride are preferably employed.

Monomers which are suitable for introduction of hydroxyl groups into the poly(methyl)acrylic copolymers which optionally contain urethane groups are, for example, hydroxyalkyl esters of alpha,beta-unsaturated carboxylic acids, such as (meth)acrylic acid, e.g. with primary hydroxyl groups, such as e.g. hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples which may be mentioned of hydroxyalkyl esters with a secondary hydroxyl group which can be used are 2-hydroxypropyl acrylate, 2-hydroxybutyl acrylate, 3-hydroxybutyl acrylate and the corresponding methacrylates.

The hydroxyl-functionalized component can advantageously be at least in part a reaction product of one mol of hydroxyethyl acrylate and/or hydroxyethyl methacrylate and on average two mol of epsilon-caprolactone.

A reaction product of acrylic acid and/or methacrylic acid with the glycidyl ester of a carboxylic acid with a tertiary alpha-carbon atom can also be employed, at least in part, as the hydroxyl-functionalized component. Glycidyl esters of highly branched monocarboxylic acids are obtainable, for example, under the trade name "Cardura". The reaction of acrylic acid or methacrylic acid with the glycidyl ester of a carboxylic acid with a tertiary alpha-carbon can take place before, during or after the polymerization reaction.

In addition to the abovementioned monomers, further ethylenically unsaturated monomers can also be used in the preparation of the (meth)acrylic copolymers. The choice of further ethylenically unsaturated monomers is not critical, and the conventional olefinic monomers, with or without further functional groups, for polymerization can be employed. Preferably, the monomers are chosen in a manner with which the expert is familiar such that their incorporation does not lead to undesirable properties of the copolymer.

Suitable further ethylenically unsaturated monomers are, for example, in particular alkyl esters of acrylic and methacrylic acid, such as e.g. methyl (meth)acrylate, ethyl (meth) acrylate, propyl (meth)acrylate, butyl (meth)acrylate, isopropyl (meth)acrylate, isobutyl (meth)acrylate, tert-butyl (meth)acrylate, pentyl (meth)acrylate, hexyl (meth)acrylate, cyclohexyl (meth)acrylate, 2-ethylhexyl (meth)acrylate , octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate and octadecenyl (meth)acrylate. The use of silane-modified monomers, such as e.g. gamma-methacryloxypropyltrimethoxysilane or gamma-methacryloxypropyl-tris(2-methoxy-ethoxy)-silane, is also possible.

Instead of the abovementioned alkyl esters of acrylic and methacrylic acid, or together with these alkyl esters, further ethylenically unsaturated monomers can be employed for the preparation of (meth)acrylic copolymers, the choice of these monomers largely depending on the desired properties of the coating compositions in respect of hardness, elasticity, compatibility and polarity.

Examples of further suitable ethylenically unsaturated monomers are the alkyl esters of maleic, fumaric, tetrahydrophthalic, crotonic, isocrotonic, vinylacetic and itaconic acid, such as e.g. corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Small amounts of monomers with at least two polymerizable, olefinically unsaturated double bonds can furthermore also be employed. The content of these monomers is preferably below 5 wt. %, based on the total weight of monomers.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylenebismethacrylamide, trimethylolpropane triacrylate, trimethylolpropane trimethacrylate and similar compounds.

Monovinyl-aromatic compounds are another suitable component. They preferably contain 8 to 9 carbon atoms per molecule. Examples of suitable compounds are styrene, vinyltoluene, alpha-methylstyrene, chlorostyrene, o-, m- or p-methylstyrene, 2,5-dimethylstyrene, p-methoxystyrene, p-tert-butylstyrene, p-dimethylaminostyrene, p-acetamidostyrene and m-vinylphenol. Vinyltoluenes and, in particular, styrene are preferably employed. It is also possible to use silane-modified monomers, such as e.g. gamma-methacryloxypropyltrimethoxysilane or gamma-methacryloxypropyl-tris(2-methoxy-ethoxy)-silane.

The copolymeric binder component A) is prepared by free-radical copolymerization. The amount of monomer is adjusted here so that the desired specifications in respect of molecular weight, OH group ratio, OH number and acid number are achieved. It may prove advantageous here to meter in a portion of the monomers at a staggered time with respect to one another.

For the preparation of the copolymers, the monomers or the monomer mixture which is employed can comprise initiators. If the monomer mixture does not comprise initiators, they can be added to the monomer mixture optionally at a slightly staggered time or metered in separately. After-polymerization can then also be carried out over a relatively long period of time, e.g. for several hours. It is then possible to adjust the mixture to a desired solids content, for example of the order of 30 to 60 wt. %, for example 50 wt. %, with a conventional lacquer solvent.

The preparation is carried out, for example, as free-radical solution polymerization in the presence of a free radical initiator, such as is familiar to the expert. Examples of free radical initiators are dialkyl peroxides, such as di-tert-butyl peroxide, di-cumyl peroxide; diacyl peroxides, such as di-benzoyl peroxide, dilauroyl peroxide; hydroperoxides, such as cumene hydroperoxide, tert-butyl hydroperoxide; peresters, such as tert-butyl perbenzoate, tert-butyl perpivalate, tert-butyl per-3,5,5-trimethylhexanoate, tert-butyl per-2-ethyl-hexanoate; peroxide-dicarbonates, such as di-2-ethylhexyl peroxydicarbonate, dicyclohexyl peroxydicarbonate; perketals, such as 1,1-bis-(tert-butylperoxy)-3,5,5-trimethyl-cyclohexane, 1,1-bis-(tert.-butylperoxy)-cyclohexane; ketone peroxides, such as cyclohexanone peroxide, methyl isobutyl ketone peroxide; and azo compounds, such as 2,2'-azo-bis-(2,4-dimethyl-valeronitrile), 2,2'-azo-bis-(2-methylbutyronitrile), 1,1,1-azo-bis-cyclohexanecarbonitrile, azo-bis-isobutyronitrile; and C-C cleaving initiators, such as e.g. benzopinacol derivatives.

The polymerization initiators are in general added, for example, in an amount of 0.1 to 4 wt. %, based on the weight of monomers.

In a further reaction step, OH functions of the carboxyl-functionalized (meth)acrylic copolymers can be reacted with mono-, di-, tri- or polyisocyanates for possible urethanization of the carboxyl-functionalized (meth)acrylic copolymers. The amount of di-, tri- or polyisocyanates depends on the OH number of the (meth)acrylic copolymer and is chosen in a manner familiar to the expert such that gelling is avoided. For example, copolymers with an OH number of 30 to 100 mg KOH/g are reacted with di-, tri- or polyisocyanates such that an OH number of the urethanized copolymer of 15 to 80 mg KOH/g results. A procedure can be followed here such that the carboxyl- and OH-functional (meth)acrylic copolymer is initially introduced into the reaction vessel as a solution in an aprotic solvent and the di-, tri- or polyisocyanate, optionally dissolved in an aprotic solvent, such as e.g. xylene or butyl acetate, is then metered in over a period of e.g. 30 minutes to 3 hours, e.g. at 5° C. to 80° C. The end of the reaction is reached when the NCO number of the reaction mixture is less than 0.1. In the case where monoisocyanates are used, no particular amount of isocyanate is necessary, and optionally all the OH functions of the (meth)acrylic copolymer can be reacted here. The reaction conditions are the same as for the di-, tri- or polyisocyanates. It is of course also possible to urethanize OH-functional (meth)acrylic copolymers before the introduction of carboxyl groups by reaction with acid anhydrides and only then to add on the acid. Examples of di-, tri- and polyisocyanates, which can also be employed as a mixture, are described under the description of component E).

Examples of monoisocyanates are e.g. reaction products of the diisocyanates described later for component E) with monoalcohols, such as methanol, butanol, hexanol or octanol, 1 mol of diisocyanate being reacted with 1 mol of alcohol. Further examples of monoisocyanates are alpha,alpha-dimethyl-m-isopropenylbenzyl isocyanate or isocyanato(meth)acrylate.

The polyesters which contain carboxyl groups and optionally contain urethane groups and can be employed as component A) can be built up by conventional methods from aliphatic and/or cycloaliphatic alcohols which are difunctional, trifunctional or have a higher functionality, optionally together with monohydric alcohols, and from aliphatic, aromatic and/or cycloaliphatic carboxylic acids, in particular dicarboxylic acids, and polycarboxylic acids of higher functionality. Examples of suitable alcohols are aliphatic diols, such as ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane and polyhydric aliphatic alcohols, such as glycerol, trimethylolethane, trimethylolpropane and pentaerythritol, and etherification products of diols and polyols, e.g. di- and triethylene glycol, polyethylene glycol and the neopentylglycol ester of hydroxypivalic acid.

Examples of suitable carboxylic acids are adipic, azelaic, 1,3- and 1,4-cyclohexanedicarboxylic acid, tetrahydrophthalic, hexahydrophthalic and endomethyltetrahydrophthalic acid, isophthalic acid, o-phthalic acid, terephthalic acid and anhydrides thereof and derivative thereof which are capable of esterification.

The calculated molecular weights of the polyesters are between 500 and 2,000 g/mol.

The carboxyl-functional (meth)acrylic copolymers and polyesters which can be used as component A) can be "chain-lengthened" with a lactone as already explained above. The lactones (cyclic esters) add on to carboxyl groups, the ring being opened and a new terminal carboxyl group being formed. Since if OH and COOH groups are present the OH groups react considerably faster with lactones, carboxyl-functional (meth)acrylic copolymers and carboxyl-functional polyesters which are free from OH groups are preferred for the preparation of component A). If copolymers or polyester containing OH groups are initially used as starting substances, their OH groups are preferably reacted completely or substantially with anhydrides to give carboxylic acids. An example of a particularly preferred lactone is epsilon-caprolactone.

Examples of other lactones are gamma-butyrolactone and lactones such as beta-propiolactone, delta-valerolactone, delta-butyrolactone, zeta-enantholactone and eta-caprylolactone. Such lactones can be substituted; examples of these are 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone and mixtures thereof.

The reaction with the lactone can be carried out, for example, directly after the resin synthesis, i.e. after the synthesis of the poly(meth)acrylic copolymer or of the polyester. The reaction is carried out, for example, at elevated temperature, for example at temperatures up to 100° C. The reaction can be carried out, for example, with stirring, for example for up to 10 hours.

The carboxyl-functionalized polyesters can be urethanized, like the carboxyl-functionalized (meth)acrylic copolymers already described. The reaction conditions and the polyisocyanates which can be used are the same as for the (meth)acrylic copolymers. Introduction of the urethane groups is possible by 1. reaction of the carboxyl- and OH-functional polyesters, 2. reaction of the lactone-modified carboxyl-functional and OH-functional polyesters with mono, di or tri- or polyisocyanates. The reaction of carboxyl- and OH-functional polyesters, before the lactonization, with polyisocyantes is preferred. It is possible here to urethanize a large proportion or the total amount of OH groups, so that in the case of lactone reaction these OH groups can no longer enter into competing reactions to carboxyl groups.

It is also possible to introduce the urethane groups during synthesis of the polyester itself. This is effected by replacing all or a portion of the di- or tricarboxylic acids by di- or triisocyanates.

The abovementioned routes 1) and 2) are preferred, and route 1) is particularly preferred. Examples of mono-, di- tri- or polyisocyanates which can be employed are mentioned in the later description of component E).

The coating compositions according to the invention comprise as component B) one or more epoxide-functionalized crosslinking agents. These are, for example, compounds with at least two epoxide functions in the molecule. The latter can have an epoxide equivalent weight of, for example, 200–700, preferably 250–500, and in particular 300–400, in each case based on the solid resin. The number-average molecular weight (Mn) is preferably 200 to 10,000 g/mol. The glass transition temperature is preferably −20° to 70° C., particularly preferably 0° C. to 50° C., and in particular 5° C. to 40° C. The upper limit is preferably up to 50° C., for example up to 25° C.

Examples of these are conventional di- or polyepoxides, e.g. polyglycidyl ethers based on diethylene glycol, dipropylene glycol or polypropylene glycol, for example with a number-average molecular weight (Mn) of up to 2,000, triglycidyl ethers of glycerol and/or di- or polyphenols, such as bisphenol A.

Further examples of di- or polyepoxides are those based on di- or polyglycidyl esters. Examples of these are reaction products of 1-hydroxy-2,3-epoxypropane with phthalic or terephthalic acid to give phthalic or terephthalic acid bis(2, 3-epoxypropyl ester), or a diglycidyl ether of bisphenol A with trimellitic anhydride to give polyesters, for example with a number-average molecular weight (Mn) of 500 to 2,000.

Examples which can also be used are glycidyl-functionalized (meth)acrylic copolymers. Examples of these are copolymers of glycidyl (meth)acrylate or 2,3-epoxycyclopentyl acrylate. Comonomers which can be chosen are esters of (meth)acrylic acid, such as e.g. methyl, ethyl, butyl, isobutyl, ethylhexyl, cyclohexyl and/or lauryl (meth)acrylate, hydroxyl-functionalized esters of (meth) acrylic acid, such as e.g. hydroxyethyl and/or hydroxypropyl esters, and furthermore also styrene, vinyltoluene and/or alpha-methylstyrene, as well as all alpha,beta-unsaturated monomers such as have already been described above for component A). The number-average molecular weight (Mn) can be, for example, between 1,000 and 10,000, and is preferably 2,000 to 5,000. Further copolymerizable glycidyl monomers are e.g. (meth)allyl glycidyl ether or 3,4-epoxy-1-vinylcyclohexane. The copolymers are prepared via free-radical solution polymerization, which is known to the expert and requires no further explanation.

According to a particularly preferred embodiment of the invention, at least one of these crosslinker resins B) is composed of the following monomers:

b1) 5 to 60 wt. % glycidyl (meth)acrylate b2) 3 to 50 wt. % tert-butyl (meth)acrylate b3) 0 to 60 wt. % of one or more aromatic vinyl-functional monomers b4) 0 to 20 wt. % of one or more hydroxyl-functional (meth)acrylic monomers b5) 0 to 92 wt. % of one or more monomers which differ from b1) to b4).

Examples of the monomers which can be used as b3) to b5) are the monomers mentioned above in the text which can be used for the preparation of the poly(meth)acrylic copolymers of component A).

In the case of the preparation of a glycidyl (meth)acrylate copolymer, it may be advantageous for a content of acid monomers, such as, for example, (meth)acrylic acid, already to be copolymerized into this copolymer. This can be effected e.g. up to an acid number of 3 to 30 mg KOH/g solid resin. To avoid an undesirable gelling of the resin, it is expedient here to choose appropriately moderate polymerization conditions. It is thus advantageous not to exceed a polymerization temperature of, for example, 120° C. and to keep the polymerization time as short as possible, e.g. up to 3 hours. Azo initiators are particularly suitable here for mild polymerization conditions.

It is also possible to subject binder components A and B at least partly to precondensation in a further reaction step. This can be effected e.g. by heating components A and B together. The desired degree of condensation can be determined, for example, from the reduction in the acid number. For example, it is possible to heat the components to temperatures of, for example, 80 to 120° C., while stirring, and to continue stirring until the acid number of the mixture has fallen, for example by 2 to 5 mg KOH/g solid resin. It is of course also possible to reduce the acid number further, but it should be ensured then that the viscosity of the mixture does not rise to gelling. The storage stability of the compositions can be increased further by precondensation of components A) and B). Precondensation between components A) and C) is also possible, and the conditions are the same as for condensation of A) and B). It is also possible to synthesize binder B) in the matrix of binder C) and vice versa.

For this, it is possible, for example, initially to introduce some or all of the polyol of component C) into the reaction vessel, optionally with one or more organic solvents, and to react therein the monomers required for the preparation of the epoxide-functional component B), or a portion thereof. For example, polyols C) can be initially introduced into the reaction vessel, optionally with a solvent, and heated, for example to temperatures of the order of 140° C. The monomers required for the preparation of the epoxide-functional component B) can be metered in, optionally together with initiators, for example over a period of up to 5 hours. The polyol component C) used in this procedure is preferably a polyester-polyol, in particular one with a number-average molecular weight Mn of 500 to 4,000, preferably with an acid number below 15 mg KOH/g, and preferably with an OH number of 15 to 300 mg KOH/g. Such a co-matrix polymer of B) and C) can have advantages over a mixture of B) and C), such as, for example, a better compatibility and a more homogeneous mixing.

The binder composition according to the invention and the coating compositions according to the invention can comprise one or more polyols with at least two hydroxyl functions in the molecule as component C). These polyols can be chosen, for example, from the OH-functional polyesters and (meth)acrylic copolymers, which can optionally also be urethanized, mentioned in the description of A) and for the preparation of A). These can be those which are free from carboxyl groups or which contain carboxyl groups. The latter are employed in particular if component A) is free from hydroxyl groups.

The binder composition according to the invention and the coating compositions according to the invention can comprise as component D) a crosslinking agent which reacts with hydroxyl groups to form ethers. This can be, for example, one or more melamine resins. Examples of these are butanol- or isobutanol-etherified melamines which are insoluble in water, such as e.g. the commercial products Setamin® US 138 or Maprenal® MF 610; mixed-etherified melamines which are both butanol- and methanol-etherified, such as e.g. Cymel® 254, and hexamethyloxymethylmelamine (HMM-melamines), such as e.g. Cymel® 301 or Cymel® 303, it being possible for an acid catalyst, such as e.g. p-toluenesulfonic acid, optionally to be added to the latter for the crosslinking.

Further examples of melamine resin crosslinking agents are conventional hydrophilic and therefore water-soluble or -compatible melamine resins, such as e.g. methyl-etherified melamines, such as e.g. Cymel® 325, Cymel® 327, Cymel® 350 and Cymel® 370, and Maprenal® MF 927.

The binder compositions and coating compositions according to the invention can also comprise a crosslinking agent based on triazine as crosslinker component D). An example for this is a triazine triscarbamate of the general formula

In this formula, R can be an alkyl radical having 1 to 20 C atoms, an aryl radical having 6 to 20 C atoms and/or an aralkyl radical having 7 to 20 C atoms. The radicals R can be identical or different. Specific examples of these carbamate crosslinking agents are 2,4,6-tris-(methoxycarbonylamino)-1,3,5-triazine and 2,4,6-tris (butoxycarbonylamino)-1,3,5-triazine.

The coating compositions according to the invention can comprise one or more free or masked polyisocyanates as crosslinking agents which form urethane groups with OH groups (component E). Examples of polyisocyanates which can be employed are cycloaliphatic, aliphatic or aromatic polyisocyanates, such as tetramethylene diisocyanate, hexamethylene diisocyanate, 2,2,4-trimethylene diisocyanate, dodecane 1,2-diisocyanate, cyclohexane 1,3- and 1,4-diisocyanate, 1-isocyanato-3,3,5-trimethyl-5-isocyanatomethylcyclohexane (=isophorone diisocyanate IPDI), perhydrodiphenylmethane 2,4'- and/or 4,4'-diisocyanate, phenylene 1,3- and 1,4-diisocyanate, toluylene 2,4- and 2,6-diisocyanate, diphenylmethane 2,4'- and/or 4,4'-diisocyanate, 3,2'- and/or 3,4-diisocyanato-4-methyldiphenylmethane, naphthylene 1,5-diisocyanate, triphenylmethane 4,4',4''-triisocyanate, tetramethylxylylene diisocyanate or mixtures of these compounds.

In addition to these simple isocyanates, those which contain heteroatoms in the radical linking the isocyanate groups are also suitable. Examples of these are polyisocyanates containing carbodiimide groups, allophanate groups, isocyanurate groups, urethane groups, acylated urea groups and biuret groups.

Polyisocyanates which are particularly suitable for the invention are the known polyisocyanates which are conventionally employed in the preparation of lacquers, e.g. modification products of the abovementioned simple polyisocyanates containing biuret, isocyanurate or urethane groups, in particular tris-(6-isocyanatohexyl)-biuret or low molecular weight polyisocyanates containing urethane groups, such as can be obtained by reaction of IPDI, employed in excess, with simple polyhydric alcohols of the molecular weight range 62–300, in particular with trimethylolpropane. Any desired mixtures of the polyisocyanates mentioned can of course also be employed for the preparation of the products according to the invention.

Suitable polyisocyanates are furthermore the known prepolymers containing terminal isocyanate groups, such as are accessible in particular by reaction of the abovementioned simple polyisocyanates, above all diisocyanates, with excess amounts of organic compounds with at least two groups which are reactive towards isocyanate groups. Such compounds which are preferably used are compounds containing at least two amino groups and/or hydroxyl groups in total and having a number-average molecular weight of 300 to 10,000, preferably 400 to 6,000.

In these known prepolymers, the ratio of isocyanate groups to hydrogen atoms which are reactive towards NCO is preferably 1.05 to 10:1, particularly preferably 1.1 to 3:1, the hydrogen atoms preferably originating from hydroxyl groups.

The nature and ratios of amounts of the starting materials employed in the preparation of NCO prepolymers are otherwise preferably chosen such that the NCO prepolymers have a) an average NCO functionality of 2 to 4, preferably of 2 to 3, and b) a number-average molecular weight of 500 to 10,000, preferably 800–4,000.

The polyisocyanates can be employed as free polyisocyanates. In this case, they are not masked. The coating compositions are then so-called two-component systems (2C systems) in which the polyisocyanates are added immediately before use. If the isocyanate groupings of the polyisocyanates are completely masked, the masked polyisocyanates can be added to the coating composition directly. The coating compositions are then so-called one-component systems (1C systems).

Masking agent which can be used are conventional masking agents such as are employed, for example, in the lacquer sector. Examples of masking agents which can be used are esters, such as dimethyl malonate, diethyl malonate and ethyl acetoacetate, lactams, such as epsilon-caprolactam, acetanilide, acetylacetone, acetone oxime, substituted pyrazoles, such as dimethylpyrazole, propane-1,2-diol and/or oximes, such as butanone oxime.

The masking of the polyisocyanates can be effected e.g. by heating one or more polyisocyanates with the masking agent. For example, one or more polyisocyanates can be initially introduced into the reaction vessel and heated, e.g. to about 80° C., while stirring, and the masking agent can be metered in (for example over a period of about 10 min). The mixture is stirred until the NCO number is less than 0.1%. It is also possible to mask one or more polyisocyanates with a mixture of two or more masking agents.

The advantage of using two or more different polyisocyanates and/or two or more different masking agents lies in the fact that with these crosslinking can take place over a wide temperature range.

If non-masked, free polyisocyanates are employed in aqueous systems, it may be advantageous to equip the polyisocyanates with hydrophilic or hydrophobic groups. By using hydrophilic polyisocyanates, these can be dispersed in water more easily. By introducing hydrophobic groups, faster diffusion of the hydrophobized polyisocyanates into the resin particles in aqueous systems takes place.

The binder composition according to the invention and therefore the coating agent compositions according to the invention can comprise one or more anhydride components F) as additional crosslinking agents which lead to ester groups with OH groups.

Component F) comprises at least one organic compounds which contains at least two cyclic carboxylic acid anhydride groups per molecule. The content of carboxylic acid anhydride groups (formally calculated as $C_4O_3$, molecular weight=96) in these compounds is preferably 5 to 88 wt. %, particularly preferably 6 to 30 wt. %. Suitable examples are trimellitic anhydride adducts of the general formula (I)

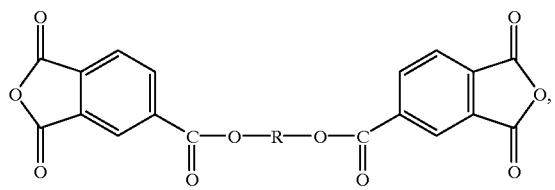

(I)

wherein R represents a divalent hydrocarbon radical having 2 to 12 carbon atoms which optionally contains ether oxygen atoms. Possible compounds of the formula (I) are, for example, the corresponding trimellitic anhydride esters of ethylene glycol, propylene glycol, diethylene glycol, triethylene glycol, neopentylglycol, glycerol or trimethylolpropane.

Further suitable polyanhydrides are, for example, benzophenonetetracarboxylic acid dianhydrides of the general formula (II)

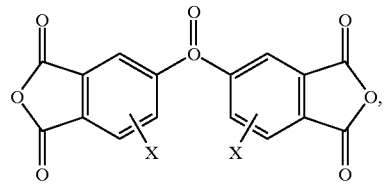

(II)

wherein X represents hydrogen or halogen, $NO_2$, —COOH or —$SO_3H$ substituents and the two aromatic nuclei can be identical or different. Examples of these are 3,3',4,4'-benzophenonetetracarboxylic acid dianhydride; 2-bromo-3,3',4,4'-benzophenonetetracarboxylic acid dianhydride or 5-nitro-3,3',4,4'-benzophenonetetracarboxylic acid dianhydride.

1,2,4,5-benzenetetracarboxylic acid dianhydride of the formula (III)

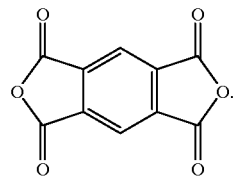

(III)

for example, is furthermore also suitable.

Component F) particularly preferably comprises copolymers of olefinically unsaturated monomers which contain a statistical average of at least 2 cyclic carboxylic acid anhydride groups per molecule. These are preferably copolymers of maleic anhydride and/or itaconic anhydride with comonomers such as are employed, for example, as monomers for component A) and are already disclosed above by way of example. Copolymers based on maleic anhydride, styrene and/or alkyl esters of acrylic and/or methacrylic acid are particularly suitable. The copolymers preferably have a number-average molecular weight (Mn) of 1,500 to 75,000, preferably 2,000 to 50,000.

They can be prepared e.g. in a completely analogous manner to copolymers A).

The compositions can also comprise monoepoxide compounds G), preferably with an average molecular weight of up to 3,000, particularly preferably of less than 1,000. In the case of these low molecular weights, these compounds can have a very positive influence on the viscosity properties of the lacquers prepared with them, since they then function here as it were as reactive thinners.

Examples of such compounds are e.g. reaction products of a diglycidyl compound, e.g. a diglycidyl ether, such as one mol of bisphenol A diglycidyl ether, and one mol of a saturated or unsaturated monocarboxylic acid, such as acetic acid, propionic acid or isononanoic acid. Further examples are reaction products of hydroxyethyl epoxides, such as 1-hydroxy-2,3-epoxypropane, with aromatic polycarboxylic acids, such as phthalic or terephthalic acid, to give the corresponding polyesters, such as phthalic or terephthalic acid bis-(2,3-epoxypropyl ester), or reaction products of diglycidyl ethers, such as bisphenol A diglycidyl ether, with acid anhydrides, such as trimellitic anhydride, to give polyester with a number-average molecular weight of 500 to 3,000, preferably up to 1,000. Further examples are reaction products of di- or polyepoxides, such as e.g. polyglycidyl ethers based on diethylene glycol, dipropylene glycol and polypropylene glycol with a number-average molecular weight of up to 2,000 and triglycidyl ethers of glycerol and/or polyphenols, such as bisphenol A or F, with the monocarboxylic acids mentioned.

The glycidyl ester of versatic acid with the commercial product name Cardura E from Shell AG is particularly preferred.

The binder composition according to the invention and therefore the coating agent compositions according to the invention can comprise one or more catalysts (component H) for the reaction of carboxyl groups with epoxide groups. These are, in particular, catalysts which are soluble in organic solvents or in water or miscible with organic materials. Examples of suitable catalysts which are soluble in organic solvents or miscible with organic materials are phosphonium salts, such as, for example, ethyltriphenylphosphonium acetate, phosphate, chloride, bromide or iodide, butyltriphenylphosphonium acetate, phosphate, chloride, bromide or iodide and benzyltriphenylphosphonium acetate, phosphate, chloride, bromide or iodide, and the quaternary ammonium salts, such as, for example, alkylbenzyldimethylammonium chlorides, benzyltrimethylammonium chloride, methyltrioctylammonium chloride, tetraethylammonium bromide, N-dodecylpyridinium chloride and tetraethylammonium iodide. The preferred catalysts which are soluble in organic solvents or miscible with organic materials are ethyltriphenylphosphonium acetate, phosphate, chloride or bromide, butyltriphenylphosphonium acetate, phosphate, chloride or bromide, benzyltriphenylphosphonium acetate, phosphate, chloride or bromide and methyltrioctylammonium chloride. Ethyltriphenylphosphonium phosphate can be obtained, for example, from ethyltriphenylphosphonium acetate by reaction with phosphoric acid. Further examples of catalysts are acids, such as sulfonic acids, e.g. p-toluenesulfonic acid. It is also possible to react the glycidyl-functionalized resin with p-toluenesulfonic acid, for example at elevated temperature, up to, for example, 80° C. In this reaction, the p-toluenesulfonic acid is added on with opening of the oxirane ring. During stoving of the finished lacquer, the p-toluenesulfonic acid is split off again and can catalyse the COOH/epoxide crosslinking. Further examples are dinonylnaphthalenedisulfonic acid, dinonylnaphthalenemonosulfonic acid and dodecylbenzenesulfonic acid. The acid catalysts can be partly, completely or excessively neutralized. Possible neutralizing agents are tertiary amines, such as e.g. triethylamine, dimethylethanolamine or dimethyloxazolidine.

The composition can comprise the catalyst, which is soluble in organic solvents and/or water or miscible with organic materials, in an amount of about 0 to about 10 wt. %, preferably 0.3 to 2.0 wt. %, based on the sum of the weights of components A) to G).

It is also possible to link an amine catalyst with the COOH-functionalized (meth)acrylic copolymer resin mixture. This is expediently effected by copolymerization of tertiary amino(meth)acrylamide monomers during the synthesis of the COOH-functionalized (meth)acrylic copolymer resin.

Examples of such monomers are dimethylaminoethyl (meth)acrylate, diethylaminopropyl (meth)acrylate and dimethylaminopropyl (meth)acrylate-amide. The content in terms of amount of these (meth)acrylates is preferably 0.5 to 10 wt. %, particularly preferably 1 to 5 wt. %, based on the total solids content of the COOH-functionalized (meth) acrylic copolymer resin.

When preparing the binder composition or coating agent composition according to the invention, the ratios of amounts are preferably chosen such that a molar ratio of the reactive groups of 1:3 to 3:1 exists between the resin containing carboxyl groups of component A) and the epoxide component B), and that, preferably, between the sum of the weights of components A) to C) and the weight of component D) a ratio of 65:35 to 98:2 and/or between the sum of the weights of components A) to C) and the weight of polyisocyanate component E) a ratio of 60:40 to 95:5 prevails.

The coating compositions according to the invention can comprise solvents such as are conventional, for example, for the preparation of coating compositions, for example lacquers. These can also be solvents such as are used in the preparation of the individual components. Examples of such solvents are organic solvents, in particular conventional solvents for lacquers, such as aliphatic and aromatic hydrocarbons, for example toluene, xylene and mixtures of aliphatic and/or aromatic hydrocarbons, esters, ethers and alcohols. Aqueous solutions can also be prepared for the preparation of the coating compositions from the binders according to the invention. Suitable emulsifiers such as are conventional in the lacquer sector can optionally be used for this purpose. The content of solvent in the coating compositions is e.g. 2 to 20 wt. %.

The binder compositions according to the invention and the coating compositions according to the invention can also be in aqueous form, in which case they are free from organic solvents or have only a relatively low content of organic solvents. The content of water is e.g. 10 to 70 wt. %; the content of solvent in addition to water is e.g. 0 to 20 wt. %. To prepare aqueous compositions it is possible, for example, largely to free the carboxyl-containing component A) from organic solvents, e.g. by distillation, and then to neutralize some of the carboxyl groups, e.g. with bases, such as triethylamine or dimethylethanolamine, and then to form an emulsion in water, which is optionally heated. The other resins can then optionally be emulsified into this emulsion, in which component A) acts as an emulsifier resin. This is effected e.g. by heating the emulsifier resin to 60–80° C. and adding the hydroxyl- and/or epoxide-functional resins, which are also heated to 60–80° C., in the course of 5–120 minutes, while stirring. The addition of all the other resins and lacquer additives can also take place before the emulsification.

It is likewise also possible, for example, to mix the COOH-functionalized resin of component A), which has been largely freed from solvents, with the epoxy resin, which has been largely freed from solvents, and to form an emulsion in a water/emulsifier mixture by means of a rotor/stator unit. It is also possible to emulsify the components separately and to mix the emulsions. Possible emulsifiers are e.g. ethoxylated sorbitan fatty acid esters.

For preparation of the coating compositions according to the invention, pigments, fillers and/or conventional auxiliary substances and additives in lacquers can be added. These are conventional additives in lacquers such as are usual in the lacquer sector. The amounts lie in the conventional range familiar to the expert. For example, the coating compositions according to the invention can comprise 2 to 60 wt. % of one or more pigments and/or fillers. The amount of additives is, for example, 0.01 to 10 wt. %.

Examples of pigments are colouring pigments, such as titanium dioxide or carbon black, and effect pigments, such as metal flake pigments and/or pearlescent pigments. The coating compositions according to the invention comprise effect pigments together with colouring pigments or colouring pigments together with fillers. Examples of fillers are conventional fillers in lacquers, such as e.g. talc and silicates. Examples of additives are auxiliary substances and additives, such as plasticizers, light stabilizers, stabilizers and flow control agents, such as silicone oils.

The coating compositions prepared from the binders according to the invention are suitable for coatings which adhere to a large number of substrates, such as, for example, wood, textiles, plastic, glass, ceramic and, in particular, metal.

The coating compositions according to the invention can be applied by known processes, such as e.g. spraying, dipping, rolling or knife-coating. In these, the coating is applied from the coating compositions according to the invention, for example as a top lacquer coating, to the substrate which is optionally already provided with further layers of lacquer. After an evaporation phase, the coating composition applied is crosslinked by heating. The stoving temperatures are e.g. 20 to 180° C., preferably 60 to 150° C. The layer thickness of the stoved film is, for example 15 to 60 μm. A crosslinked, hard, glossy and acid-resistant lacquer coating is formed here.

A preferred embodiment is application of the coating composition according to the invention as a clear lacquer coating on a base lacquer, preferably an aqueous base lacquer comprising coloured and/or effect pigments. This can be carried out by the wet-in-wet process, or the base lacquer is dried beforehand by heating. A particularly good adhesion of the two layers is obtained here.

Base lacquers, which can comprise conventional top lacquer pigments, for example, can be overlacquered with the coating compositions which have been formulated according to the invention as clear lacquer coatings without pigments; they preferably comprise effect pigments, such as e.g. metallic pigments. Polyester, polyurethane or (meth) acrylic copolymer resins are preferably employed as the binder base of the base lacquer. These binders can optionally be crosslinked via crosslinking agents, e.g. melamine derivatives or isocyanate derivatives.

It is also possible to add supercritical carbon dioxide as a lacquer solvent to the coating composition according to the invention, in particular as a clear lacquer, and to apply the mixture.

In addition to formulation as clear lacquers, the coating compositions according to the invention can also be formulated as base lacquers, and also as fillers. They are then particularly suitable for the preparation of multi-layer lacquerings, e.g. in the motor vehicle sector. Conventional additives such as e.g. have been described above for base lacquers can be added for formulation as base lacquers or fillers.

Compared with conventional base lacquers, the base lacquers according to the invention give, in particular, coatings with an improved resistance to damp heat.

The base lacquers according to the invention can be overlacquered with conventional clear lacquers by the wet-in-wet process, optionally after brief surface-drying. They are preferably overlacquered with clear lacquers based on the coating compositions according to the invention.

DETAILED DESCRIPTION OF THE PREFERRED EMBODIMENT

In the following examples, parts (P) and percentages relate to weight, unless stated otherwise.

EXAMPLE 1
Preparation of a Polyester Oligomer 336.7 P trimethylolpropane, 366.8 P adipic acid and 297 P hexanediol are esterified with 5 P hypophosphorous acid to an acid number of 20 mg KOH/g at 180° C. to 230° C. in the melt in a 2 liter three-necked flask provided with a stirrer, separator, thermometer and reflux condenser.

Condensation is then carried out in vacuo down to an acid number of less than 1.5 mg KOH/g.

The product obtained in this way has a stoving residue of 94.5% (1 h, 150° C.), a viscosity of 3,200 mPa.s (100%), a hydroxyl number of 466 mg KOH/g and a colour number of 30 Hazen.

EXAMPLE 2
Preparation of an Epoxide-functional Resin A

990 P xylene Solvesso 100 are initially introduced into a 4 liter three-necked flask provided with a stirrer, thermometer, dropping funnel and reflux condenser and are heated to 140° C., while stirring.

In the course of 5 h, a mixture of
842.4 P glycidyl methacrylate
300.0 P tert-butyl acrylate
348.6 P styrene
383.4 P butyl acrylate
11.10 P di-tert-butyl peroxide
64.50 P tert-butyl peroxy-2-ethylhexanoate is added dropwise. The monomer mixing vessel and dropping funnel are rinsed with 60 P Solvesso, which are added to the batch. Thereafter, after-polymerization is carried out for 6 h at 140° C.

The epoxide-functional resin has a solids content of 64.5% (1 h, 150° C.) and a viscosity of 1,200 mPa.s.

Preparation of an Epoxide-functional Resin B

990 P Solvesso 100 are initially introduced into a 4 liter three-necked flask provided with a stirrer, thermometer, dropping funnel and reflux condenser and are heated to 140° C., while stirring.

In the course of 5 h, a mixture of
842.40 P glycidyl methacrylate
564.39 P styrene
467.61 P butyl acrylate
11.10 P di-tert-butyl peroxide
64.50 P tert-butyl peroxy-2-ethylhexanoate is added dropwise. The monomer mixing vessel and dropping funnel are rinsed with 90 P Solvesso, which are added to the batch. Thereafter, after-polymerization is carried out for 6 h at 140° C.

The resin has a solids content of 64.5% (1 h, 150° C.) and a viscosity of 1,100 mPa.s.

Preparation of an Epoxide-functional Resin C

990 P Solvesso 100 are initially introduced into a 4 liter three-necked flask provided with a stirrer, thermometer, dropping funnel and reflux condenser and are heated to 140° C., while stirring.

In the course of 5 h, a mixture of
842.40 P glycidyl methacrylate
245.79 P styrene
324.93 P butyl acrylate
300.00 P tert-butyl acrylate
161.28 P hydroxyethyl acrylate
11.10 P di-tert-butyl peroxide
64.50 P tert-butyl peroxy-2-ethylhexanoate is added dropwise. The monomer mixing vessel and dropping funnel are rinsed with 60 P Solvesso, which are added to the batch. Thereafter, after-polymerization is carried out for 6 h at 140° C.

The epoxide-functional resin has a solids content of 64.5% (1 h, 150° C.) and a viscosity of 1,600 mPa.s.

Preparation of an Epoxide-functional Resin D

990 P Solvesso 100 are initially introduced into a 4 liter three-necked flask provided with a stirrer, thermometer, dropping funnel and reflux condenser and are heated to 140° C., while stirring.

In the course of 5 h, a mixture of 842.40 P glycidyl methacrylate 461.58 P styrene 409.14 P butyl acrylate 161.28 P hydroxyethyl acrylate 11.10 P di-tert-butyl peroxide 64.50 P tert-butyl peroxy-2-ethylhexanoate is added dropwise. The monomer mixing vessel and dropping funnel are rinsed with 60 P Solvesso, which are added to the batch. Thereafter, after-polymerization is carried out for 6 h at 140° C.

The epoxide-functional resin has a solids content of 64.5% (1 h, 150° C.) and a viscosity of 1,650 mPa.s.

Preparation of an Epoxide-functional Co-matrix Polymer E

990 P Solvesso 100 and 450 P of the oligomer described in example 1 are initially introduced into a 4 liter three-necked flask provided with a stirrer, thermometer, dropping funnel and reflux condenser and are heated to 140° C., while stirring.

In the course of 5 h, a mixture of 842.40 P glycidyl methacrylate 248.70 P styrene 33.30 P butyl acrylate 300.00 P tert-butyl acrylate 11.10 P di-tert-butyl peroxide 64.50 P tert-butyl peroxy-2-ethylhexanoate is added dropwise. The monomer mixing vessel and dropping funnel are rinsed with 60 P Solvesso, which are added to the batch. Thereafter, after-polymerization is carried out for 6 h at 140° C.

The epoxide-functional resin has a solids content of 64.5% (1 h, 150° C.) and a viscosity of 1,400 mPa.s.

Preparation of an Epoxide-functional Co-matrix Polymer F

990 P Solvesso 100 and 450 P of the oligomer described in example 1 are initially introduced into a 4 liter three-necked flask provided with a stirrer, thermometer, dropping funnel and reflux condenser and are heated to 140° C., while stirring.

In the course of 5 h, a mixture of 842.40 P glycidyl methacrylate 7.67 P styrene 574.32 P butyl acrylate 11.10 P di-tert-butyl peroxide 64.50 P tert-butyl peroxy-2-ethylhexanoate is added dropwise. The monomer mixing vessel and dropping funnel are rinsed with 60 P Solvesso, which are added to the batch. Thereafter, after-polymerization is carried out for 6 h at 140° C.

The epoxide-functional resin has a solids content of 64.5% (1 h, 150° C.) and a viscosity of 1,500 mPa.s.

EXAMPLE 3

Synthesis of an Acid Crosslinking Agent Based on the Oligomer from Example 1)

1,101.6 P of the product from example 1) and 300 P xylene are mixed with 985.8 P hexahydrophthalic anhydride in a 4 liter three-necked flask provided with a stirrer, thermometer and reflux condenser and esterification is carried out at 140° C. to a constant acid number. 312.6 P epsilon-caprolactone are then added. The reaction is carried out at 140° C. until the theoretical solids content is reached. When the reaction has ended, the resin is diluted with 300 P n-butanol.

The carboxyl-functional resin has a stoving residue of 79.6% (1 h, 150° C.), an acid number of 150 mg KOH/g solid resin and a viscosity of 1,400 mPa.s.

Preparation of a Clear Lacquer

The following recipe was used for the preparation of a clear lacquer composition:

38.80 P of the epoxide-functional polymer from example 2) A, B, C, D, E or F 36.20 P of the acid crosslinking agent from example 3)

9.00 P n-butanol 9.00 P methoxypropanol 5.00 P butyldiglycol acetate 0.4 P of a commercially available flow control agent based on silicone oil 1.6 P light stabilizer (1:1 mixture of benzotriazole derivative and sterically hindered amine)

The mixture is adjusted to a spraying viscosity of 28 seconds $AK_4$ flow cup with a mixture of methoxypropanol and butylglycol acetate. The clear lacquer is applied by the wet-in-wet process using a spray gun on to a metal sheet coated with a commercially available water-based filler and a commercially available water-based base lacquer, allowed to evaporate at room temperature for 8 minutes and stoved at 80° C. for 5 minutes and then at 140° C. for 17 minutes.

The tests listed were carried out with the resulting coatings and the following characteristic values obtained.

|  | Ex. 2A + ex. 3 | Ex. 2B + ex. 3 | Ex. 2C + ex. 3 | Ex. 2D + ex. 3 | Ex. 2E + ex. 3 | Ex. 2F + ex. 3 |
|---|---|---|---|---|---|---|
| Comments | with tBA no OH | no tBA no OH | with tBA with HEA | no tBA with HEA | with tBA co-m. pol. | no tBA co-m. pol. |
| Pencil hardness | H | F | F | HB | F | B |
| MEK rub (no. of double strokes) | >100 | >100 | >100 | >100 | >100 | >100 |
| $H_2SO_4$ (10%, 65° C.) first marking after X min | 19 | 16 | 18 | 13 | 20 | 15 |
| Body, gloss | highly brilliant | brilliant | highly brilliant | brilliant | highly brilliant | brilliant |
| Boiling limit [μm] | >48 | from 37 | >46 | from 38 | >50 | >39 |
| Run limit [μm] | from 42 | from 37 | from 43 | from 33 | from 40 | from 33 |
| Scratch resistance | very good | good | very good | good | excellent | very good |

What is claimed is:

1. Coating composition comprising a binder composition, solvent and/or water and optionally pigments and/or fillers and optionally the conventional additives in lacquers, characterized in that the binder composition comprises:

A) 25 to 75 wt. % of one or more carboxyl-functional (meth)acrylic copolymers with a number-average molecular weight of 1,000 to 3,000 g/mol and/or one or more carboxyl-functional polyesters with a number-average molecular weight of 500 to 4,000 g/mol, the carboxyl functionality of which in each case corresponds to an acid number of 15 to 300 mg KOH/g, B) 25 to 75 wt. % of one or more epoxide-functionalized (meth)acrylic copolymers with a number-average molecular weight of 200 to 10,000 g/mol, an epoxide equivalent weight of 200 to 700 and a glass transition temperature of −20 to 70° C., which have been prepared co-using 3 to 50 wt. %, based on the total weight of the monomer units, of tert-butyl (meth)acrylate as a monomer unit, the ratio of the amounts of A) to B) being chosen such that the molar ratio of their reactive groups is 1:3 to 3:1.

C) 0 to 50 wt. % of one or more polyols which have at least two hydroxyl functions in the molecule and differ from a component A) optionally containing hydroxyl functions, D) 0 to 40 wt. % of components which crosslink with hydroxyl groups to form ethers, and/or of a crosslinking agent based on triazine, E) 0 to 40 wt. % of one or more polyisocyanates, which can optionally be masked, F) 0 to 50 wt. % of an anhydride component comprising at least one organic polyanhydride with at least two cyclic carboxylic acid anhydride groups per molecule, G) 0 to 20 wt. % of one or more reactive thinners with an epoxide function, H) 0 to 10 wt. % of one or more catalysts to catalyse the reaction of carboxyl and epoxide groups, the sum of the wt. % of components A) to H) adding up to 100 wt. %.

2. Coating composition according to claim 1, wherein component B) is based on a (meth)acrylic copolymer which is based on the following monomer units:

b1) 5 to 60 wt. % of one or more epoxide-functional olefinically unsaturated monomers, b2) 3 to 50 wt. % tert-butyl (meth)acrylate, b3) 0 to 60 wt. % of one or more aromatic vinyl-functional monomers, b4) 0 to 20 wt. % of one or more hydroxyl-functional (meth)acrylic monomers, b5) 0 to 92 wt. % of one or more monomers which differ from b1) to b4), the sum of the wt. % of b1) to b5) adding up to 100 wt. %.

3. Coating composition as claimed in claim 2, wherein said epoxide-functional olefinically unsaturated monomers comprise glycidyl (meth)acrylate.

4. Coating composition according to claim 1, comprising as component A) one or more carboxyl-functional (meth) acrylic copolymers or carboxyl-functional polyesters, at least some of the carboxyl functions of which are reacted with lactone.

5. Coating composition according to claim 1, wherein or some of component B) has been prepared by polymerization in the presence of component C).

6. A process for production of multi-layered laquers comprising:

applying a primer and, optionally one or more intermediate layers to a substrate;

subsequently, applying a base lacquer comprising coloured and/or effect pigments;

subsequently, overlacquering said base lacquer with a clear lacquer;

wherein said base lacquer and said clear lacquer are applied by a wet-in-wet process and stoved together; and wherein at least one of said base lacquer and said clear lacquer comprises a coating composition according to claim 1.

* * * * *

UNITED STATES PATENT AND TRADEMARK OFFICE
Certificate

Patent No. 6,200,639 B1                                                          Patented: March 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Volker Duecoffre, Wuppertal, Germany; Walter Schubert, Wuppertal, Germany; Friedrich Herrmann, Wuppertal, Germany; Carmen Flosbach, Wuppertal, Germany; Claudia Leckebusch, Wuppertal, Germany; and Astrid Tückmantel, Radevormwald, Germany.

Signed and Sealed this Sixth Day of January 2004.

ROBERT A. DAWSON
*Supervisory Patent Examiner*
Art Unit 1712